(12) United States Patent
Ino

(10) Patent No.: US 10,866,542 B2
(45) Date of Patent: Dec. 15, 2020

(54) IMAGE FORMING APPARATUS

(71) Applicant: CANON KABUSHIKI KAISHA, Tokyo (JP)

(72) Inventor: Koichiro Ino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/532,821

(22) Filed: Aug. 6, 2019

(65) Prior Publication Data

US 2020/0057404 A1 Feb. 20, 2020

(30) Foreign Application Priority Data

Aug. 14, 2018 (JP) .................................. 2018-152596

(51) Int. Cl.
   *G03G 15/16* (2006.01)
   *G03G 15/01* (2006.01)

(52) U.S. Cl.
   CPC ....... *G03G 15/162* (2013.01); *G03G 15/0131* (2013.01); *G03G 2215/00059* (2013.01); *G03G 2215/00063* (2013.01)

(58) Field of Classification Search
   CPC ............. G03G 15/162; G03G 15/0131; G03G 2215/00063; G03G 2215/00059; G03G 15/5058; G03G 15/5062; G03G 2215/00042; G03G 2215/0161; G03G 2215/00616; G01N 2021/556
   See application file for complete search history.

(56) References Cited

U.S. PATENT DOCUMENTS

| 8,902,463 | B2 * | 12/2014 | Shukuya | ............ | G03G 15/5058 |
|---|---|---|---|---|---|
| | | | | | 347/236 |
| 9,377,739 | B2 | 6/2016 | Masuda | | |
| 10,031,459 | B2 | 7/2018 | Ino et al. | | |
| 10,444,693 | B2 | 10/2019 | Hirano et al. | | |
| 2013/0216245 | A1 | 8/2013 | Hoshi et al. | | |
| 2015/0293487 | A1 | 10/2015 | Takenaga et al. | | |
| 2015/0323882 | A1 | 11/2015 | Fukuhara | | |
| 2015/0362878 | A1 | 12/2015 | Nagashima | | |

FOREIGN PATENT DOCUMENTS

JP 2013-031333 A 2/2013

OTHER PUBLICATIONS

Extended European Search Report dated Jan. 27, 2020, in European Patent Application No. 19191398.7.

* cited by examiner

*Primary Examiner* — Susan S Lee
(74) *Attorney, Agent, or Firm* — Venable LLP

(57) ABSTRACT

An image forming apparatus includes an optical sensor for detecting an image formed on an intermediate transfer belt. The optical sensor includes first and second light emitting diodes (LEDs) and first and second photodiodes (PDs). The first and second LEDs irradiate an optical-axis center point of an intermediate transfer belt. The first PD is arranged at a position at which an optical axis of specularly reflected light of light emitted from the second LED and an optical axis along which specularly reflected light of light emitted from the first LED is received form a first angle. The second PD is arranged at a position at which the optical axis of the specularly reflected light of the light emitted from the second LED and an optical axis along which diffused reflected light of the light emitted from the second LED is received form a second angle different from the first angle.

12 Claims, 12 Drawing Sheets

IMAGE FORMING APPARATUS

BACKGROUND OF THE INVENTION

Field of the Invention

The present disclosure relates to an image forming apparatus configured to detect a detection image formed on an image bearing member.

Description of the Related Art

An electrophotographic image forming apparatus is configured to form images of colors of yellow (Y), magenta (M), cyan (C), and black (K) on a sheet through electrophotographic processes of charging, exposing, developing, and transferring. Densities of the images formed on the sheet are varied depending on temperature and humidity of the image forming apparatus, the number of prints of the image forming apparatus, and operating time of the image forming apparatus. To address this problem, the image forming apparatus is configured to form a detection image on an image bearing member, which is different from the sheet, detect the detection image by an optical sensor included in the image forming apparatus, and adjust an image forming condition for an image density based on a result of the detection.

The image forming apparatus is also configured to superimpose images of different colors to form an image of mixed colors. Therefore, when image forming positions of the yellow image, the magenta image, the cyan image, and the black image are different, a tint of the image of the mixed colors does not become a desired tint. This is called "color misregistration". It is known that the color misregistration is also varied depending on the temperature and humidity of the image forming apparatus, the number of prints of the image forming apparatus, and the operating time of the image forming apparatus as with the densities of the images described above. In order to address this problem, the image forming apparatus is configured to correct the color misregistration before the tint of the color image is changed. For example, the image forming apparatus is configured to form a detection image of a different color for detecting the color misregistration on the image bearing member, detect the detection image by the optical sensor, and detect a color misregistration amount based on a result of the detection. The image forming apparatus is configured to adjust the image forming positions of the respective colors based on the detected color misregistration amount.

The optical sensor included in the image forming apparatus includes a light emitter, and a light receiver configured to receive reflected light from the detection image on the image bearing member. Methods of detecting the detection image by the optical sensor include a specularly reflected light method of detecting specularly reflected light from the detection image, and a diffused reflected light method (diffusely reflected light method) of detecting diffused reflected light from the detection image. For example, an image forming apparatus described in Japanese Patent Application Laid-open No. 2013-031333 is configured to execute, by an optical sensor including two light emitting elements and two light receiving elements, processing of detecting specularly reflected light from a detection image, and processing of detecting diffused reflected light from the detection image.

However, the optical sensor described in Japanese Patent Application Laid-open No. 2013-031333 is assembled by soldering bullet light emitting elements and bullet light receiving elements on a substrate, and hence it is difficult to reduce the size of the optical sensor. Further, when a light receiving element for detecting color misregistration and a light receiving element for detecting an image density are to be mounted on one sensor, the arrangement of those light receiving elements is restricted, and hence it is difficult for the optical sensor to receive reflected light at an ideal angle from the detection image. Therefore, in the image forming apparatus including the optical sensor including the bullet element for detecting color misregistration and the bullet element for detecting the image density, there has been a fear that a color misregistration amount and an image density cannot be detected with high accuracy.

SUMMARY OF THE INVENTION

An image forming apparatus, which is configured to form an image on a sheet, according to the present disclosure includes a plurality of image forming units configured to form images of different colors; an image bearing member, on which pattern images of different colors and a test image are to be formed; a sensor including a substrate having formed thereon a light emitting element, a first light receiving element, and a second light receiving element; and a controller configured to adjust color misregistration based on a result of receiving diffused reflected light from the pattern images by the first light receiving element and adjust image densities of the plurality of image forming units based on a result of receiving diffused reflected light from the test image by the second light receiving element. A first angle, which is formed between a first virtual line and a normal orthogonal to a surface of the image bearing member, is smaller than an angle of incidence of the light from the light emitting element, wherein the first virtual line passes through a point of incidence of light from the light emitting element and the first light receiving element, and wherein the normal passes through the point of incidence. A second angle, which is formed between a second virtual line and the normal orthogonal to a surface of the image bearing member, is smaller than the angle of incidence of the light from the light emitting element, the second virtual line passes through the point of incidence of the light from the light emitting element and the second light receiving element, and the normal passes through the point of incidence. The second angle is larger than the first angle.

Further features of the present invention will become apparent from the following description of exemplary embodiments (with reference to the attached drawings).

DESCRIPTION OF THE EMBODIMENTS

Now, at least one embodiment of the present disclosure is described in detail with reference to the drawings.

Overall Configuration

Figure 1:
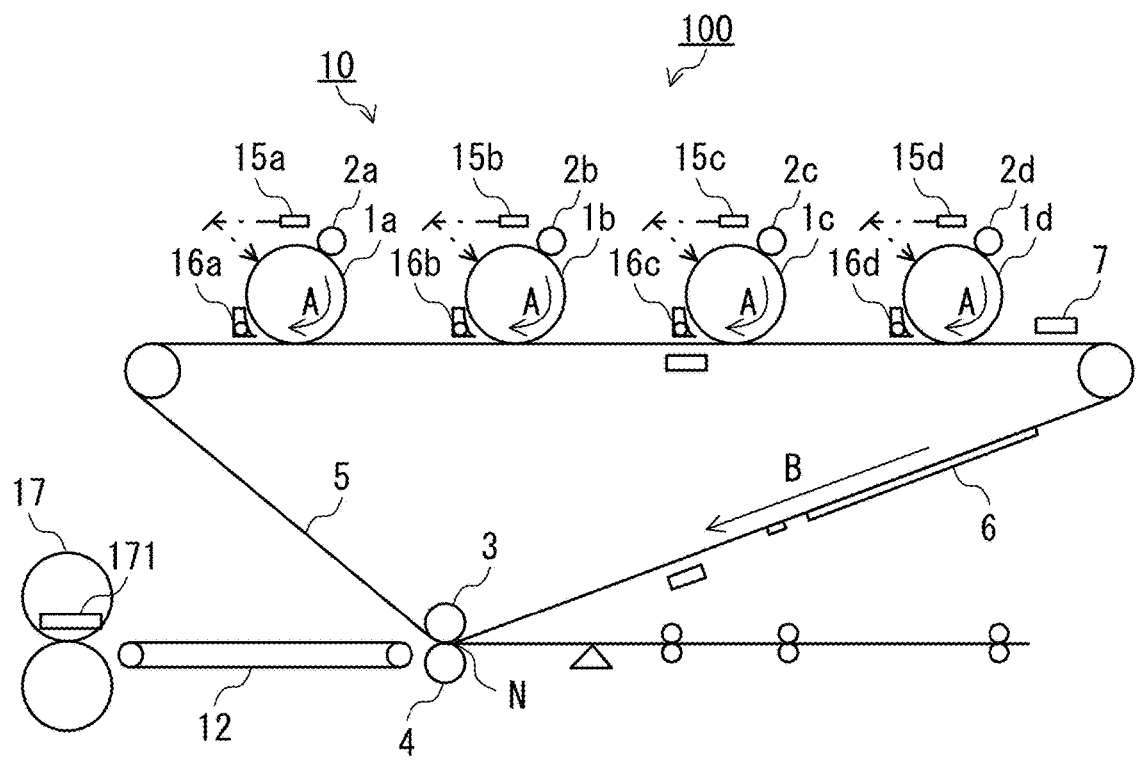
FIG. 1 is a schematic cross-sectional view of an image forming apparatus according to at least one embodiment of the present disclosure.

FIG. 1 is a schematic cross-sectional view of an image forming apparatus 100 according to at least one embodiment. The image forming apparatus 100 includes photosensitive drums 1a to 1d, charging devices 2a to 2d, exposure devices 15a to 15d, developing devices 16a to 16d, an intermediate transfer belt 5, a belt support roller 3, a transfer roller 4, and a fixing device 17. In the following description, the photosensitive drums 1a to 1d, the charging devices 2a to 2d, the exposure devices 15a to 15d, and the developing devices 16a to 16d are referred to as an "image forming unit 10" configured to form yellow (Y), cyan (C), magenta (M), and black (K) toner images. The letter "a" suffixed to the reference signs represents a configuration for forming the yellow image. The letter "b" suffixed to the reference signs represents a configuration for forming the cyan image. The letter "c" suffixed to the reference signs represents a configuration for forming the magenta image. The letter "d" suffixed to the reference signs represents a configuration for forming the black image.

The intermediate transfer belt 5 is stretched around a plurality of rollers including a drive roller and the belt support roller 3. To the intermediate transfer belt 5, the toner images formed by the image forming unit 10 are transferred. The intermediate transfer belt 5 serves as an image bearing member configured to bear and convey the toner images. Moreover, the intermediate transfer belt 5 also serves as an intermediate transfer member, to which the toner images are to be transferred. The transfer roller 4 is arranged on a side opposite to the belt support roller 3 with respect to the intermediate transfer belt 5. A nip portion N formed by the transfer roller 4 pressing the intermediate transfer belt 5 is called a "transfer portion". The images on the intermediate transfer belt 5 are transferred onto a sheet at the nip portion N. The sheet is conveyed to the transfer portion by conveyance rollers. The transfer roller 4 is configured to transfer the toner images formed on the intermediate transfer belt 5 onto the sheet at the transfer portion.

The photosensitive drums 1a, 1b, 1c, and 1d are each rotated in a direction of the arrow A. The photosensitive drums 1a, 1b, 1c, and 1d each have a photosensitive layer on a surface thereof. The photosensitive drums 1a, 1b, 1c, and 1d serve as photosensitive members. The charging devices 2a, 2b, 2c, and 2d are configured to charge the surfaces of the photosensitive drums 1a, 1b, 1c, and 1d, respectively. The exposure devices 15a, 15b, 15c, and 15d are configured to expose the charged surfaces of the photosensitive drums 1a, 1b, 1c, and 1d to light, respectively. The surfaces of the photosensitive drums 1a, 1b, 1c, and 1d are scanned with laser light emitted from the exposure devices 15a, 15b, 15c, and 15d so that electrostatic latent images are formed on the surfaces of the photosensitive drums 1a, 1b, 1c, and 1d, respectively. The developing devices 16a, 16b, 16c, and 16d are configured to develop the electrostatic latent images with toner (developer) to form the toner images of respective colors on the photosensitive drums 1a, 1b, 1c, and 1d, respectively.

The drive roller of the intermediate transfer belt 5 is rotated to rotate the intermediate transfer belt 5 in a direction of the arrow B. The toner images of respective colors formed on the photosensitive drums 1a, 1b, 1c, and 1d are sequentially transferred onto the intermediate transfer belt 5, which is the image bearing member, in an overlapping manner. As a result, a full-color toner image 6 is formed on the intermediate transfer belt 5.

The intermediate transfer belt 5 is rotated to convey the toner image 6 to the transfer portion. The toner image 6 is transferred onto the sheet when passing through the transfer portion. The sheet having the toner image 6 transferred thereto is conveyed to the fixing device 17 by a conveyance belt 12. The fixing device 17 includes a heater 171. The heater 171 is configured to heat the toner image 6 to fix the toner image 6 onto the sheet. Then, the sheet is delivered to a tray (not shown) of the image forming apparatus 100. In this manner, image forming processing by the image forming apparatus 100 is ended.

On a downstream side of the photosensitive drum 1d in a conveyance direction (direction B) of the intermediate transfer belt 5, an optical sensor 7 is arranged. The optical sensor 7 is configured to detect pattern images for detecting color misregistration and a test image for detecting an image density, which are formed on the intermediate transfer belt 5. A result of detecting the pattern images is used to determine a color misregistration amount, which is used for color misregistration correction. A result of detecting the test image is used to determine a correction amount to be used for image density correction. In the following, when the pattern images and the test image are not distinguished, the pattern images and the test image are referred to as a "detection image".

The toner images of respective colors, which are transferred from the photosensitive drums 1a to 1d onto the intermediate transfer belt 5, may be shifted in transfer position on the intermediate transfer belt 5. It is known that this is caused by an increase in temperature of the exposure devices 15a to 15d. The shift in transfer position causes color misregistration, which changes a hue and a color tone of the full-color image. To address this problem, the image forming apparatus 100 is configured to detect the pattern images by the optical sensor 7, and correct the color misregistration detected by a result of the detection.

Moreover, the image forming apparatus 100 may vary in density of the image to be formed due to a usage environment (temperature and humidity) and an increase in the number of prints. To address this problem, the image forming apparatus 100 is configured to detect the test image by the optical sensor 7, and perform image density correction, in which an image forming condition regarding an image density is controlled based on a result of detecting the test image. In this case, the image forming condition regarding the image density includes intensities of laser light to be emitted by the exposure devices 15a to 15d, developing biases to be applied to the developing devices 16a to 16d, charging biases to be applied to the charging devices 2a to 2d, or transfer biases to be applied to the transfer roller 4, for example. In order to correct the image density, the image forming apparatus 100 may control a plurality of image forming conditions, or control only a particular image forming condition.

Optical Sensor

Figure 2:
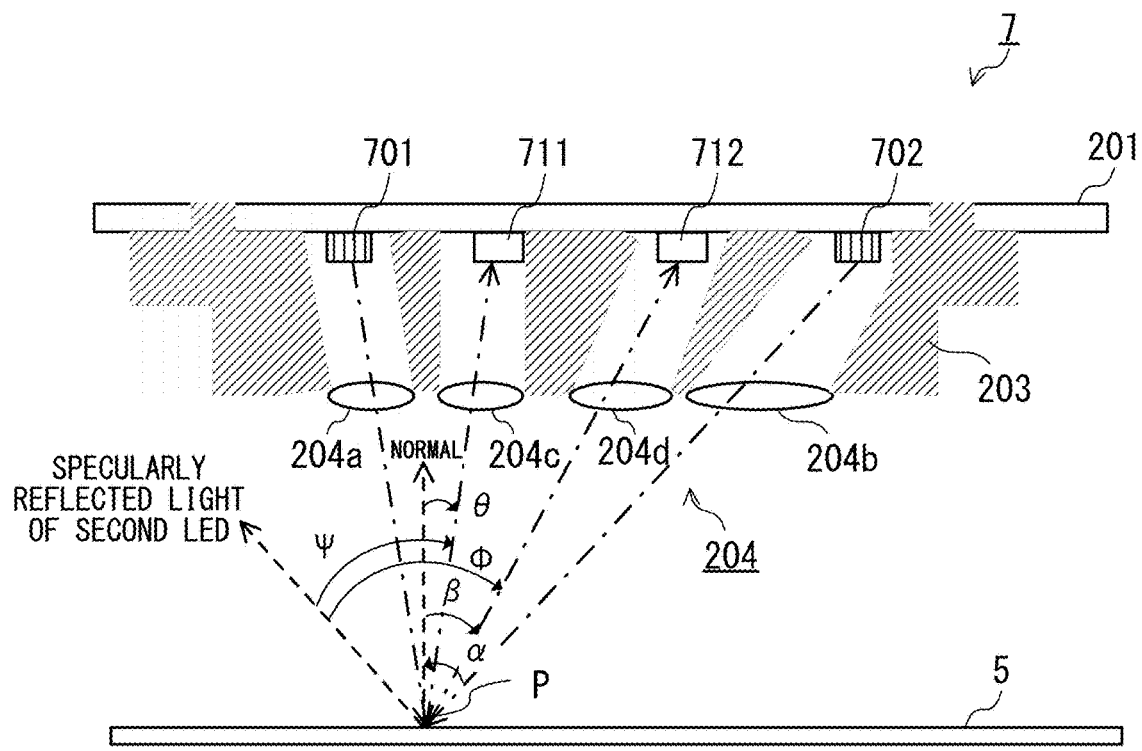
FIG. 2 is a schematic view of a main part of an optical sensor.

FIG. 2 is an explanatory view of the optical sensor 7. The optical sensor 7 includes two light emitting elements and two light receiving elements. The optical sensor 7 includes two light emitting diodes (LEDs) (first LED 701 and second LED 702) as the light emitting elements. The optical sensor 7 includes two photodiodes (PDs) (first PD 711 and second PD 712) as the light receiving elements. The first LED 701, the second LED 702, the first PD 711, and the second PD 712 are bonded to a predetermined surface (mounting surface) of the same substrate 201 by die bonding and wire bonding. Optical axes of light emitted from the first LED 701 and the second LED 702 are orthogonal to the predetermined surface (mounting surface) of the substrate 201. Further, optical axes of reflected light received by the first PD 711 and the second PD 712 are also orthogonal to the predetermined surface (mounting surface) of the substrate 201.

Because all elements are mounted on the predetermined surface (mounting surface) of the substrate 201, the plurality of elements can be mounted on the substrate 201 when a reflow step is performed once. As a result, a manufacturing cost of the optical sensor 7 can be reduced as compared to a manufacturing cost of an optical sensor in which a plurality of elements are mounted on both sides of the substrate 201. The substrate 201 is a printed circuit board (PCB), for example, but the present disclosure is not limited thereto. The first LED 701, the second LED 702, the first PD 711, and the second PD 712 are electrically connected to a power supply circuit (not shown) and a detection circuit (not shown), for example, via the substrate 201.

The first LED 701 is configured to emit light to an object to be measured (intermediate transfer belt 5 or detection image on the intermediate transfer belt 5). The first PD 711 is arranged at a position at which, when the first LED 701 emits light, specularly reflected light from the object to be measured can be received. An optical-axis center point P (point of incidence) of FIG. 2 indicates a position at which the light emitted from the first LED 701 to the intermediate transfer belt 5 is reflected. In other words, the first LED 701 and the first PD 711 are arranged such that the light emitted from the first LED 701 is specularly reflected (so that an angle of incidence and an angle of reflection are equal to each other) at the optical-axis center point P, and the reflected light is received by the first PD 711. The optical-axis center point P is a detection position of the optical sensor 7.

The second LED 702 is arranged at a position at which specularly reflected light of light emitted to the intermediate transfer belt 5 is not received by the first PD 711 or the second PD 712. In other words, the second LED 702 is arranged such that, even when the light emitted from the second LED 702 is specularly reflected at the optical-axis center point P of the intermediate transfer belt 5, the reflected light is not received by the first PD 711 or the second PD 712. Even when the light emitted from the second LED 702 is specularly reflected by the detection image, the specularly reflected light from the detection image is not received by the first PD 711 or the second PD 712. The second LED 702 is arranged at a position at which diffused reflected light of the light emitted to the intermediate transfer belt 5 is received by the first PD 711 and the second PD 712. The first LED 701 and the second LED 702 are arranged so as to irradiate the optical-axis center point P, which is the same position. The second LED 702 is arranged at a position at which a virtual line connecting the second LED 702 and the optical-axis center point P forms an angle $\alpha$ (angle of incidence) with respect to a normal of the intermediate transfer belt 5 at the optical-axis center point P. The angle $\alpha$ is 35°, for example.

The first PD 711 is arranged at a position at which both of 1) the specularly reflected light of light emitted from the first LED 701 to the intermediate transfer belt 5 and 2) diffused reflected light of light emitted from the second LED 702 to the intermediate transfer belt 5 are received. The second PD 712 is arranged at a position at which diffused reflected light of light emitted from the second LED 702 to the intermediate transfer belt 5 is received. The second PD 712 is not arranged at the position at which the specularly reflected light of the light emitted from the first LED 701 to the intermediate transfer belt 5 is received. The first PD 711 and the second PD 712 are not arranged at positions at which the specularly reflected light of the light irradiated from the second LED 702 to the intermediate transfer belt 5 is received. The first PD 711 and the second PD 712 are arranged on the second LED 702 side (light emitting element side) of a position at which the normal of the intermediate transfer belt 5 at the optical-axis center point P and the substrate 201 cross each other. The first PD 711 is arranged at a position at which a virtual line connecting the first PD 711 and the optical-axis center point P forms an angle $\theta$ with respect to the normal of the intermediate transfer belt 5 at the optical-axis center point P. The second PD 712 is arranged at a position at which a virtual line connecting the second PD 712 and the optical-axis center point P forms an angle $\beta$ with respect to the normal of the intermediate transfer belt 5 at the optical-axis center point P. The angle $\beta$ is an angle that is larger than the angle $\theta$. The angle $\theta$ is 7°, for example. The angle $\beta$ is 18°, for example.

The substrate 201 is mounted to a housing 203. The housing 203 has light guide paths for guiding irradiation light so that light emitted from the first LED 701 and the second LED 702 efficiently irradiate the intermediate transfer belt 5. The housing 203 also has light guide paths for guiding the reflected light so that the first PD 711 and the second PD 712 efficiently receive the reflected light from the intermediate transfer belt 5. On the light guide paths for guiding the irradiation light and the light guide paths for guiding the reflected light, a lens group 204 including lenses 204a to 204d is provided.

In other words, the light emitted from the first LED 701 travels in the direction of the optical axis (one-dot broken line in FIG. 2), and irradiates, through the light guide path formed in the housing 203 and the lens 204a, the intermediate transfer belt 5. The specularly reflected light from the intermediate transfer belt 5 or the detection image travels in the direction of the optical axis (one-dot broken line in FIG. 2), and reaches, through the light guide path formed in the housing 203 and the lens 204c, the first PD 711. The light emitted from the second LED 702 travels in the direction of the optical axis (one-dot broken line in FIG. 2), and irradiates, through the light guide path in the housing 203 and the lens 204b, the intermediate transfer belt 5.

The first PD 711 is configured to receive diffused reflected light of the light with which the second LED 702 has irradiated the intermediate transfer belt 5 through the light guide path formed in the housing 203 and the lens 204c. Specularly reflected light from the first LED 701 received by the first PD 711 is used for color misregistration detection and image density detection. The diffused reflected light from the second LED 702 received by the first PD 711 is used for the color misregistration detection. In other words, the first PD 711 is used for the color misregistration detection by specular reflection, the color misregistration detection by diffused reflection, and the density detection by specular reflection.

The first PD 711 is used for the color misregistration detection by the specular reflection when receiving the specularly reflected light of the light with which the first LED 701 has irradiated the pattern images for the color misregistration detection, which are formed on the intermediate transfer belt 5. The first PD 711 is used for the density detection by the specular reflection when receiving the specularly reflected light of the light with which the first LED 701 has irradiated the test image for the image density detection, which is formed on the intermediate transfer belt 5. The first PD 711 is used for the color misregistration detection by the diffused reflection when receiving diffused reflected light of the light with which the second LED 702 irradiates the pattern images for the color misregistration detection, which are formed on the intermediate transfer belt 5.

Figure 3A:
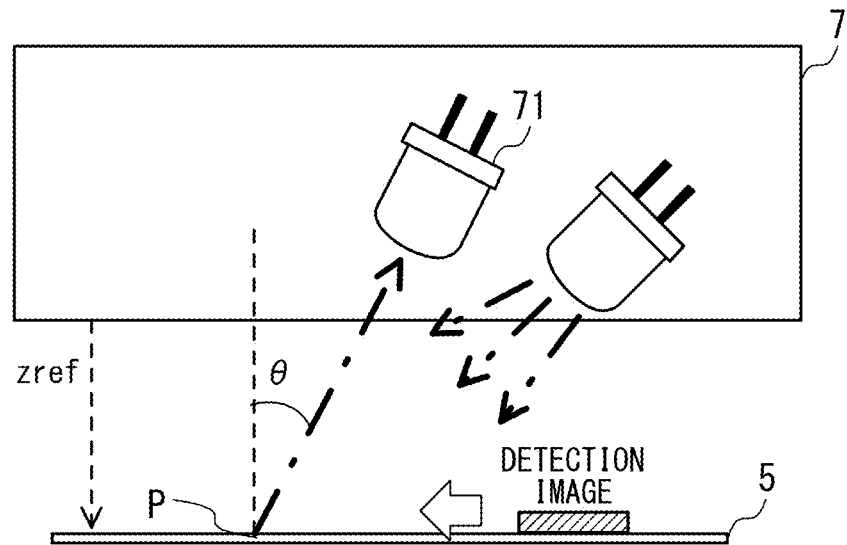
FIG. 3A and FIG. 3B are explanatory views of a shift in detection position due to oscillation of an intermediate transfer belt.
Figure 3B:
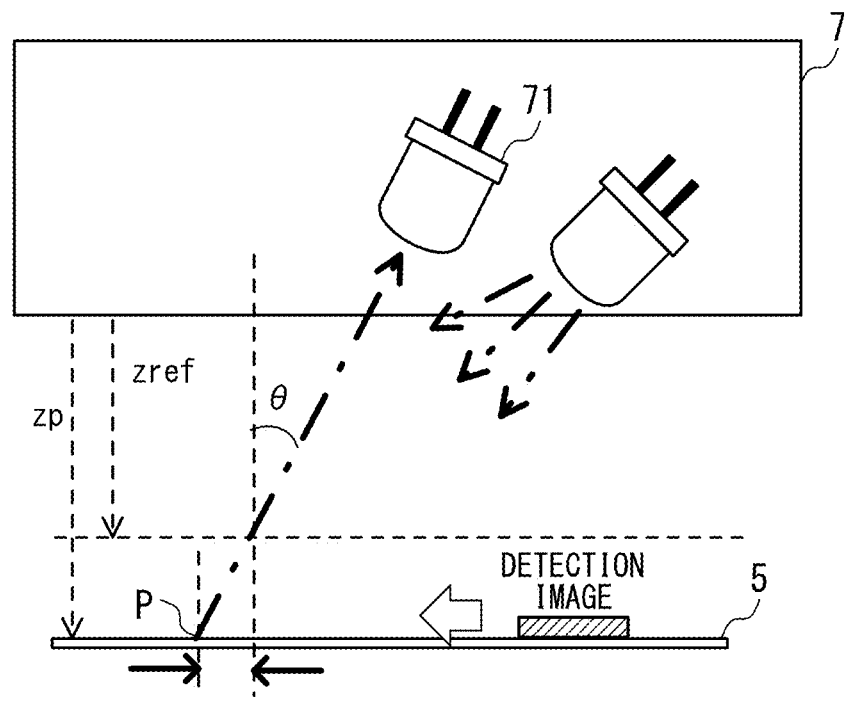

In order to accurately detect the position of the pattern images for the color misregistration detection, it is preferred that the first PD 711 have a smaller light receiving angle θ with respect to the normal of the intermediate transfer belt 5 at the optical-axis center point P. The reason is described with reference to FIG. 3A and FIG. 3B. FIG. 3A and FIG. 3B are explanatory views of a shift in detection position due to oscillation of the intermediate transfer belt 5. In FIG. 3A, a state in which the intermediate transfer belt 5 is not oscillated is illustrated. In FIG. 3B, a state in which the intermediate transfer belt 5 is oscillated is illustrated. When the intermediate transfer belt 5 is not oscillated, a distance between the optical sensor 7 and the intermediate transfer belt 5 has a predetermined value zref. When the intermediate transfer belt 5 is oscillated, the distance between the optical sensor 7 and the intermediate transfer belt 5 is a distance zp, which is larger than the predetermined value zref. When a light receiving angle of a light receiver 71 of the optical sensor 7 is an angle θ with respect to the normal direction of the intermediate transfer belt 5, the optical-axis center point P of the detection image is shifted by (zp-zref)×tan θ due to the oscillation of the intermediate transfer belt 5. Therefore, in order to accurately detect the color misregistration amount, it is preferred that the angle (light receiving angle θ) with respect to the normal of the intermediate transfer belt 5 at the optical-axis center point P become smaller. In FIG. 2, the first PD 711 is arranged so that the light receiving angle θ, which is an angle of the virtual line connected to the optical-axis center point P with respect to the normal of the intermediate transfer belt 5 on the optical-axis center point P, becomes smaller.

The second PD 712 is configured to receive diffused reflected light of the light emitted from the second LED 702 to irradiate the optical-axis center point P of the intermediate transfer belt 5, through the light guide path formed in the housing 203 and the lens 204d. The diffused reflected light from the second LED 702 received by the second PD 712 is used for the image density detection. It is preferred that the second PD 712 receive reflected light of an optical axis at an angle (to increase the angle Φ) that is far from an optical axis (optical axis of specular reflection) of specularly reflected light of the light emitted from the second LED 702 to irradiate the intermediate transfer belt 5. In this case, the density of the test image for the image density detection can be accurately detected. The reason is described with reference to FIG. 4.

Figure 4:
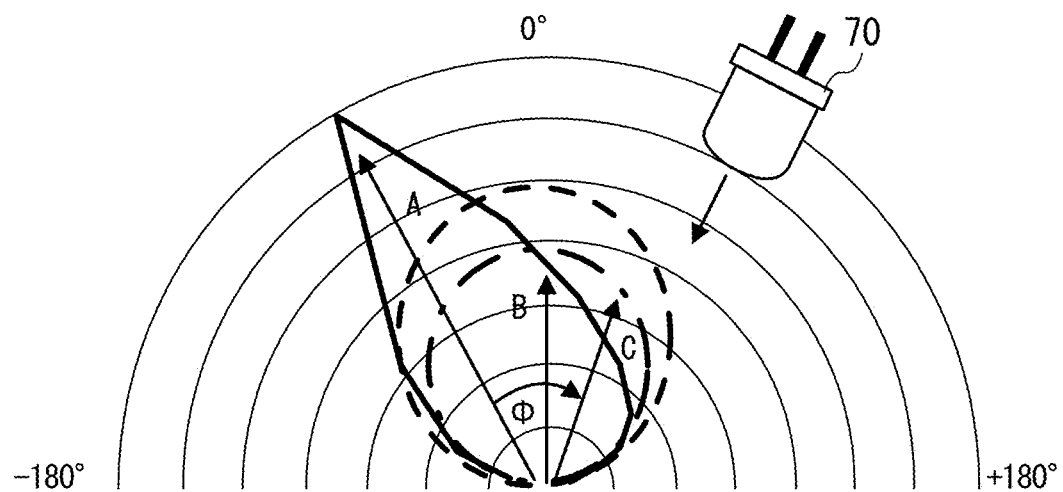
FIG. 4 is an angle distribution characteristic diagram of amounts of light reflected by the intermediate transfer belt and test images.

FIG. 4 is an angle distribution characteristic diagram of amounts of light reflected by the intermediate transfer belt 5 and the test image for the image density detection. When light is emitted by a light emitter 70 from a predetermined direction, the reflected light from the intermediate transfer belt 5 becomes stronger in the direction of specular reflection (direction A) with respect to the irradiation light. The test image for the image density detection exhibits a reflection angle characteristic of substantially Lambertian reflectance as indicated by the broken line and the one-dot broken line of FIG. 4. The image density detection is performed by forming, on the intermediate transfer belt 5, a test image in which images of different densities are combined, and detecting, by the optical sensor 7, an amount of light reflected by the test image. The solid line represents a reflection characteristic of the intermediate transfer belt 5. The broken line represents a reflection characteristic of a high-density image. The one-dot broken line represents a reflection characteristic of a low-density image.

The amount of light reflected by the low-density image is substantially equal to the amount of light reflected by the intermediate transfer belt 5 in the direction B of FIG. 4. In this case, it is difficult to detect the low-density image of the test image. This is because, in the angle characteristic of the reflected light from the intermediate transfer belt 5, reflected light exists even at a diffused reflection angle around a specular reflection angle. Therefore, it is preferred that the optical sensor 7 receive the reflected light at the angle (with larger Φ with respect to the specularly reflected light) that is far from the specularly reflected light as in the direction C of FIG. 4. In FIG. 2, the second PD 712 is arranged so that a light receiving angle Φ becomes larger.

Both of the first PD 711 and the second PD 712 are configured to detect the diffused reflected light on the intermediate transfer belt 5 of the irradiation light from the second LED 702. Therefore, the first PD 711 and the second PD 712 have the following relationship: (angle Φ formed by the second PD 712)>(angle Ψ formed by the first PD 711) with respect to the specular reflection angle from the second LED 702 (see FIG. 2). In other words, the angle Ψ is smaller than the angle Φ. The angle Ψ formed by the first PD 711 is an angle of the virtual line connecting the first PD 711 and the optical-axis center point P with respect to the optical axis of specularly reflected light from the second LED 702 (optical axis of specular reflection). The angle Φ formed by the second PD 712 is an angle of the virtual line connecting the second PD 712 and the optical-axis center point P with respect to the optical axis of the specularly reflected light from the second LED 702. The angle Φ is 53°, for example. The angle Ψ is 42°, for example.

The first LED 701, the second LED 702, the first PD 711, and the second PD 712 are mounted on the same substrate 201, and hence the elements can be mounted substantially in parallel to the intermediate transfer belt 5. Therefore, the shift of the optical axis from the optical-axis center point P can be reduced as compared to the case of forming the elements by bullet elements with lead pins, for example. Further, the first LED 701, the second LED 702, the first PD 711, and the second PD 712 are elements bonded to the substrate 201 by die bonding and wire bonding, and hence can be reduced in element interval. Therefore, the entire size of the optical sensor 7 can be reduced. For example, while a general element is about 3 mm×about 2 mm×about 1 mm, the bullet elements have dimensions of about 5 mm×about 10 mm×about 5 mm even without the lead pins. Therefore, a part volume can be significantly reduced, and the optical sensor 7 itself can be downsized.

Figure 5:
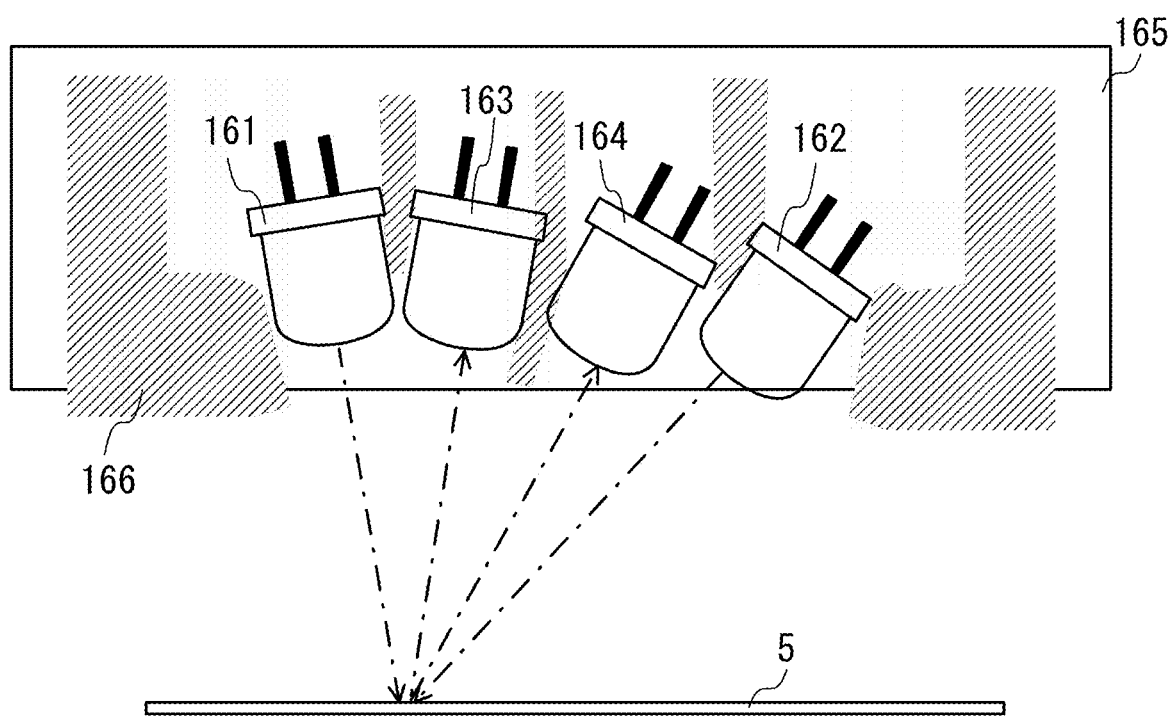
FIG. 5 is a schematic view of a main part of an optical sensor including bullet elements.

Now, as a comparative example, an optical sensor including bullet elements is described. FIG. 5 is an explanatory view of the optical sensor including the bullet elements. When a positional relationship between light emitting elements 161 and 162 and light receiving elements 163 and 164 is achieved by a relationship similar to the case in which the elements are bonded to the substrate by die bonding and wire bonding (irradiation angle, receiving angle), it is required to bring the light emitting element 161 and the light receiving element 163 closer to each other. When the light emitting element 161 and the light receiving element 163 have the positional relationship similar to that of FIG. 2 with respect to the intermediate transfer belt 5, the light emitting element 161 and the light receiving element 163 are brought too close to each other. As a result, a function as a light-shielding wall of the housing 166 provided on a substrate 165 is inhibited. Therefore, in order to prevent the light emitting elements 161 and 162 and the light receiving elements 163 and 164 from interfering with the light-shielding wall, it is required to increase the interval between the elements as in FIG. 3A, but in this case, the optical sensor is increased in size.

As described above, in the optical sensor 7 in at least one embodiment, the light emitting elements and the light receiving elements are bonded to the substrate 201 by die bonding and wire bonding. With the first LED 701, the second LED 702, the first PD 711, and the second PD 712 being bonded to the substrate 201 by die bonding and wire bonding, the distance between the elements can be reduced. As a result, the optical sensor 7 can be downsized as compared to the optical sensor including the bullet elements (FIG. 5). Moreover, according to the optical sensor 7, the distance between the first LED 701 and the first PD 711 can be reduced, and hence the specularly reflected light of the light emitted to the object to be measured can be detected at an acuter angle than that of the optical sensor including the bullet light emitting elements and the bullet light receiving elements. As a result, even when the distance from the optical sensor 7 to the object to be measured is varied, an irradiation area on the object to be measured is hardly varied. When the intermediate transfer belt 5 is rotating, the distance from the optical sensor 7 to the detection image tends to be varied. According to the optical sensor 7 in at least one embodiment, even when the distance from the optical sensor 7 to the detection image is varied, the irradiation area is hardly varied, and hence the specularly reflected light from the detection image can be detected with high accuracy. Further, the optical sensor 7 can reduce the distance between the first LED 701 and the first PD 711, and hence design flexibility is also increased. Therefore, according to the optical sensor 7, the first LED 701, the second LED 702, the first PD 711, and the second PD 712 can be arranged in a positional relationship that is suitable for detecting the specularly reflected light and the diffused reflected light from the object to be measured. In particular, in the optical sensor 7 in which the light emitting elements are shared or the light receiving elements are shared, the specularly reflected light and the diffused reflected light from the detection image can be detected more accurately than in the related-art optical sensor including the bullet elements.

Controller

Figure 6:
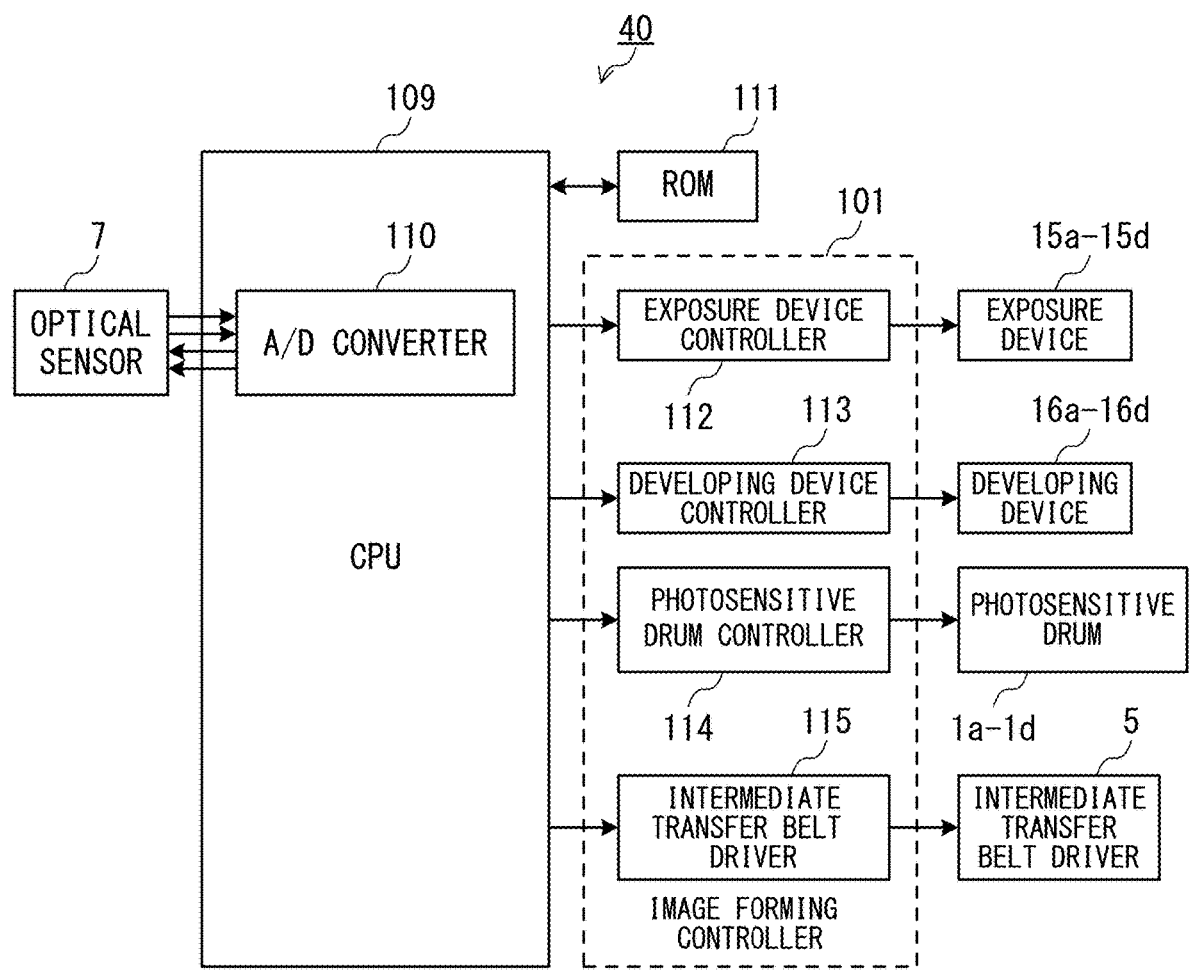
FIG. 6 is a control block diagram of the image forming apparatus.

Now, returning to the description of the image forming apparatus 100 of at least one embodiment, FIG. 6 is an exemplary diagram of an example of a configuration of a controller configured to control the image forming apparatus 100. A controller 40 includes a central processing unit (CPU) 109, a read-only memory (ROM) 111, and an image forming controller 101. The CPU 109 includes an A/D converter 110. The image forming controller 101 includes an exposure device controller 112, a developing device controller 113, a photosensitive drum controller 114, and an intermediate transfer belt driver 115. The exposure device controller 112 is configured to control intensities of laser light emitted from light sources included in the exposure devices 15a to 15d. The developing device controller 113 is configured to control motors for rotating developing rollers included in the developing devices 16a to 16d. The photosensitive drum controller 114 is configured to control motors for rotating the photosensitive drums 1a to 1d. The intermediate transfer belt driver 115 is configured to control a motor for rotating the intermediate transfer belt 5. The CPU 109 is configured to control the image forming apparatus 100 by executing a computer program stored in the ROM 111. The ROM 111 has stored therein, in addition to the computer program, pattern image data to be used to form the pattern images for the color misregistration detection, which are to be described later, and test image data to be used for forming the test image for the image density detection. The controller 40 may be implemented not only by executing the computer program, but also by a discrete part or a one-chip semiconductor product. The one-chip semiconductor product includes a micro-processing unit (MPU), an application specific integrated circuit (ASIC), or a system-on-a-chip (SOC), for example.

The CPU 109 is configured to control the optical sensor 7 to cause the first LED 701 and the second LED 702 to independently emit light (be lit).

The optical sensor 7 is configured to receive reflected light from the intermediate transfer belt 5 or the detection image formed on the intermediate transfer belt 5 by the first PD 711 and the second PD 712. The first PD 711 and the second PD 712 are configured to output, as a detection result, an analog signal obtained by converting the received reflected light into a voltage. The CPU 109 is configured to acquire analog signals output from the first PD 711 and the second PD 712 through the A/D converter 110. The CPU 109 is configured to store, in a memory (not shown), digital signals into which the analog signals are converted by the A/D converter 110.

The CPU 109 is configured to control the exposure devices 15a to 15d, the developing devices 16a to 16d, and the photosensitive drums 1a to 1d by the image forming controller 101 to form the detection image on the intermediate transfer belt 5. The CPU 109 is configured to cause the first LED 701 and the second LED 702 of the optical sensor 7 to be lit. The first LED 701 and the second LED 702 are configured to irradiate the surface (front surface) of the intermediate transfer belt 5, on which the detection image is to be formed, and the detection image formed on the intermediate transfer belt 5. The first PD 711 and the second PD 712 are configured to receive reflected light from the front surface of the intermediate transfer belt 5 and the detection image formed on the intermediate transfer belt 5 to output an analog signal corresponding to the reflected light. The CPU 109 is configured to detect the color misregistration amount and the image density in accordance with the analog signals output from the first PD 711 and the second PD 712 to perform the color misregistration correction and the image density correction.

Pattern Images

Figure 7:
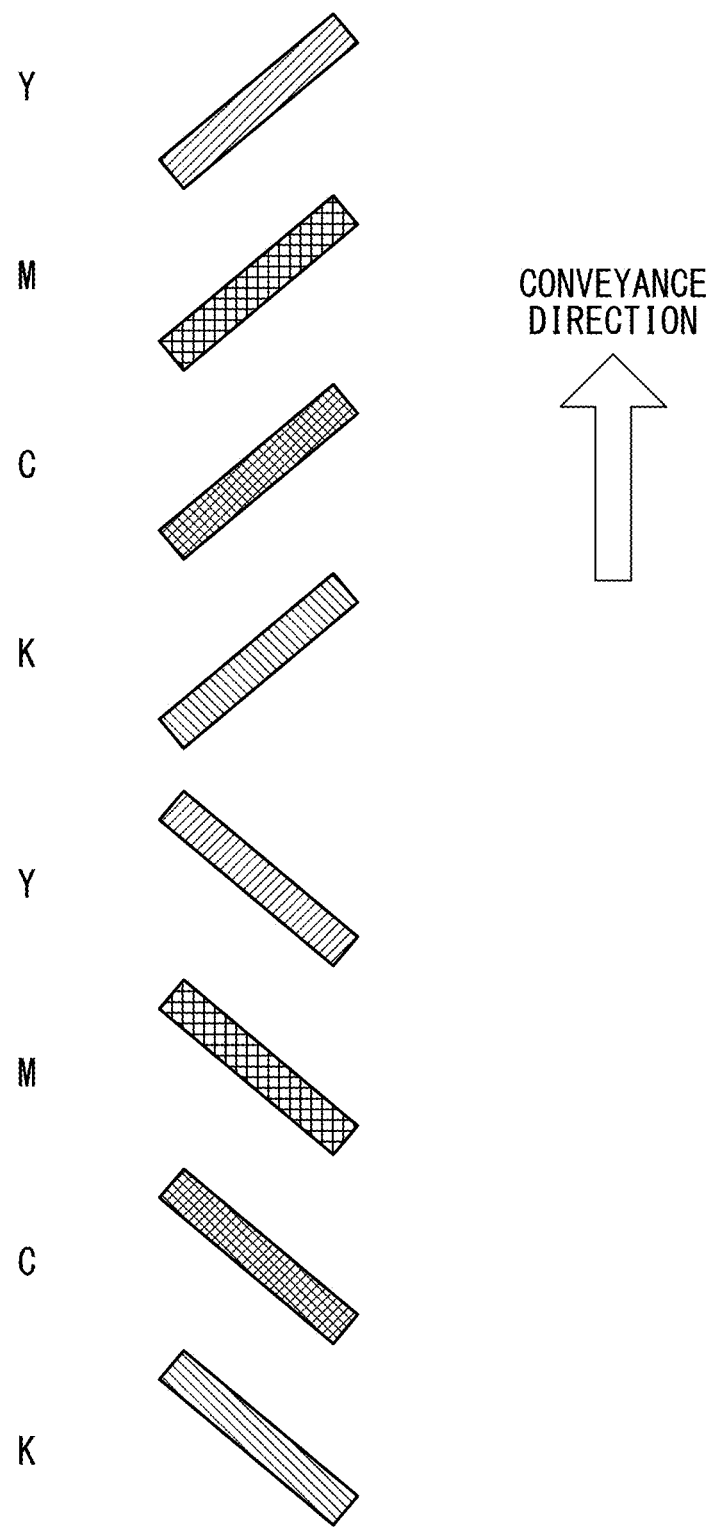
FIG. 7 is an explanatory diagram of first pattern images for detecting color misregistration.

FIG. 7 is an explanatory diagram of first pattern images for the color misregistration detection. The first pattern images include color patterns of yellow, which is a reference color, and color patterns of other colors (magenta, cyan, and black). The color patterns are images formed to be inclined at a predetermined angle (for example, 45°) with respect to the conveyance direction of the intermediate transfer belt 5. Two pattern images of the same colors are formed. The pattern images of the same colors are formed to be inclined in different directions with respect to the conveyance direction of the intermediate transfer belt 5.

The first pattern images are used in the case where the first PD 711 receives the specularly reflected light of the light emitted from the first LED 701. In other words, when an amount of the reflected light from the intermediate transfer belt 5 is a predetermined amount or more, the color misregistration amount is detected with the use of the first pattern images. When a gloss of the front surface of the intermediate transfer belt 5 is not reduced, an amount of the specularly reflected light from the front surface of the intermediate transfer belt 5 becomes larger than an amount of specularly reflected light from the first pattern images. Therefore, an analog signal value corresponding to a result of receiving the reflected light from a region (front surface of the intermediate transfer belt 5) in which the first pattern images are not formed becomes higher than an analog signal value corresponding to a result of receiving the reflected light from the first pattern images.

Figure 8:
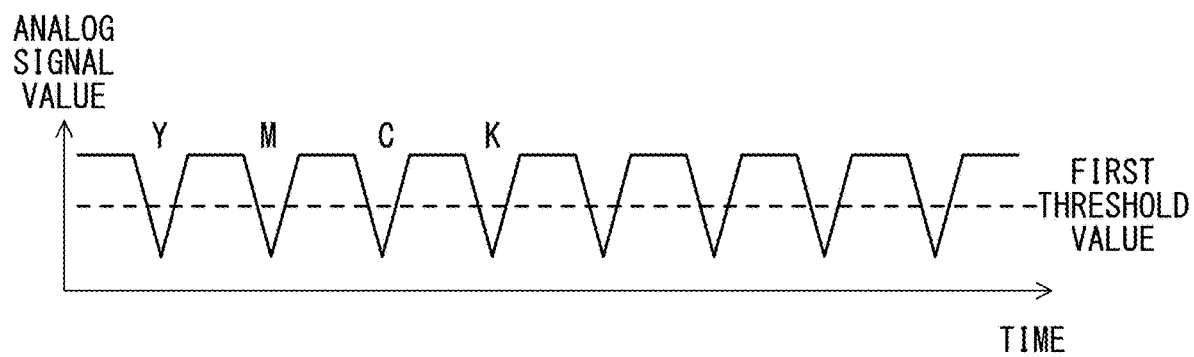
FIG. 8 is a graph for showing an example of an analog signal corresponding to a result of detecting the first pattern images for detecting the color misregistration.

FIG. 8 is a graph for showing an example of an analog signal in a case where reflected light from the first pattern images is detected by the first LED 701 and the first PD 711. An analog signal value of the first PD 711 obtained when reflected light from a color pattern is received is lower than an analog signal value of the first PD 711 obtained when the reflected light from the front surface of the intermediate transfer belt 5 is received.

The CPU 109 is configured to convert the analog signal into a binary signal indicating a first level or a second level based on a first threshold value. The converted signal corresponds to a result of comparison between the analog signal value (FIG. 8) and the first threshold value. At this time, the CPU 109 determines the first threshold value based on an analog signal value obtained when the specularly reflected light from the front surface of the intermediate transfer belt 5 of the light emitted from the first LED 701 is received by the first PD 711. Then, the CPU 109 detects a color misregistration amount of the color pattern of the first pattern images based on the binary signal described above. The color misregistration correction is a known technology, and a detailed description thereof is omitted here.

Figure 9A:
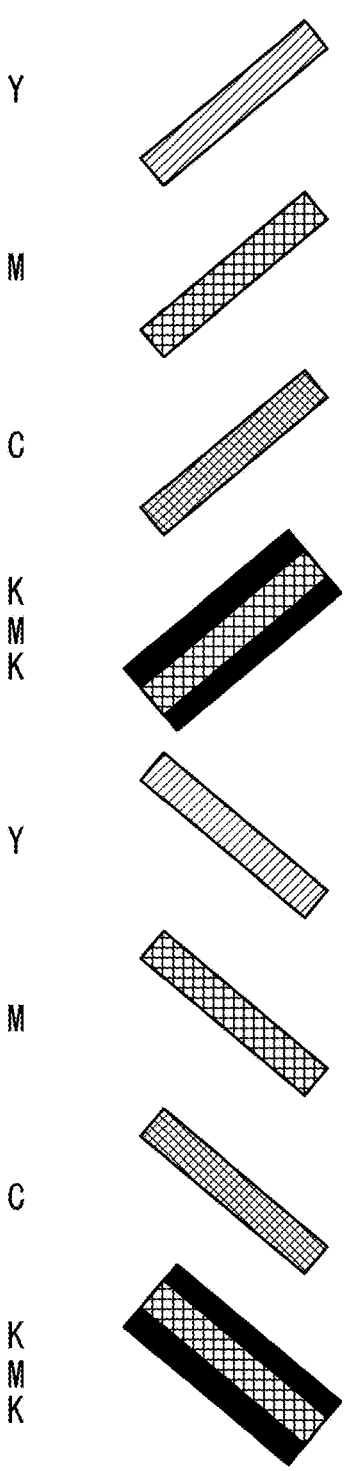
FIG. 9A and FIG. 9B are explanatory diagrams of second pattern images for detecting color misregistration.
Figure 9B:
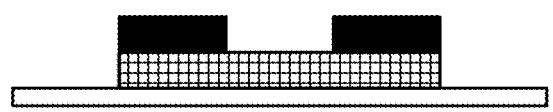

FIG. 9A and FIG. 9B are explanatory diagrams of second pattern images for the color misregistration detection. The second pattern images include color patterns of yellow, which is a reference color, and color patterns of other colors (magenta, cyan, and black). It should be noted, however, that the color patterns of black of the second pattern images are formed to be superimposed on the color patterns of magenta. The second pattern images are used when diffused reflected light of the light emitted from the second LED 702 is received by the first PD 711. In other words, when the amount of the reflected light from the intermediate transfer belt 5 is not the predetermined amount or more, a color misregistration amount is detected with the use of the second pattern images. In other words, when the amount of reflected light from the intermediate transfer belt 5 is less than the predetermined amount, the color misregistration amount is detected with the use of the second pattern images.

Figure 10:
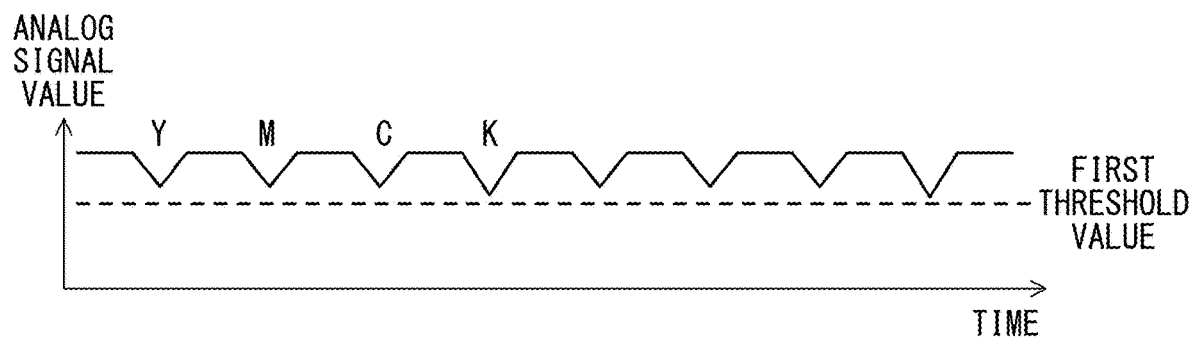
FIG. 10 is a graph for showing an example of an analog signal corresponding to a result of detecting the first pattern images for detecting the color misregistration.

When the gloss of the intermediate transfer belt 5 is reduced by wearing of the intermediate transfer belt 5, the amount of specularly reflected light from the front surface of the intermediate transfer belt 5 is reduced. FIG. 10 is a graph for showing an example of an analog signal obtained when the reflected light from the first pattern images formed on the intermediate transfer belt 5, which has the reduced amount of specularly reflected light, is detected by the first LED 701 and the first PD 711. When the amount of specularly reflected light from the intermediate transfer belt 5 is reduced, as shown in FIG. 10, a difference between the analog signal value obtained when specularly reflected light from the color patterns of respective colors is received and the analog signal value obtained when the specularly reflected light from the intermediate transfer belt 5 is received is reduced. Therefore, in some cases, CPU 109 may not detect the color misregistration amount from the binary signal with high accuracy.

Figure 11:
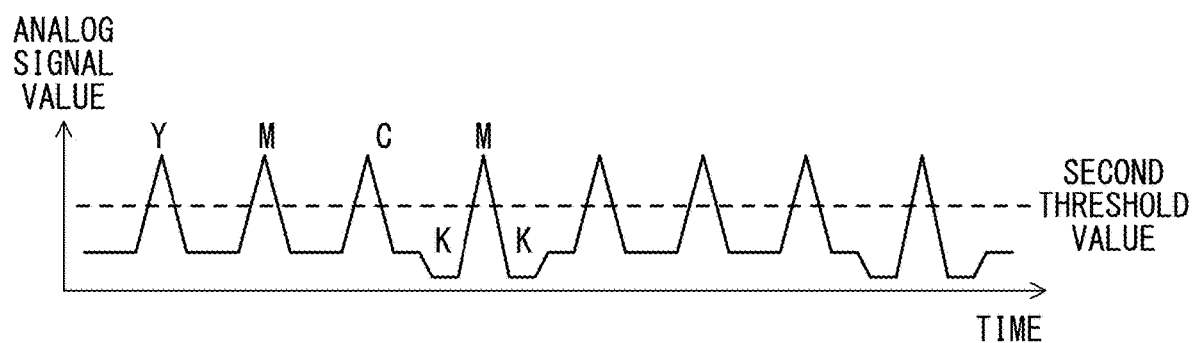
FIG. 11 is a graph for showing an example of an analog signal corresponding to a result of detecting the second pattern images for detecting the color misregistration.

To address this problem, under a state in which the amount of specularly reflected light from the intermediate transfer belt 5 is reduced, the second pattern images are formed, and diffused reflected light from the second pattern images is detected by the optical sensor 7. The optical sensor 7 receives diffused reflected light of the light emitted from the second LED 702 by the first PD 711. FIG. 11 is a graph for showing an example of an analog signal obtained when reflected light from the second pattern images formed on the intermediate transfer belt 5, which has the reduced amount of specularly reflected light, is detected by the second LED 702 and the first PD 711.

As illustrated in FIG. 9A, the second pattern images are different from the first pattern images. Specifically, the color patterns of black are superimposed on the color patterns of magenta. When the color patterns of black are detected with the use of diffused reflected light, the light emitted from the second LED 702 is absorbed by a black toner. Therefore, a difference between the amount of diffused reflected light from the color patterns of only black and the amount of diffused reflected light from the intermediate transfer belt 5 becomes extremely smaller. In each of the color patterns of black of the second pattern images, a pattern formed with the use of a magenta toner is exposed from a gap of patterns formed at an interval with the use of the black toner. This is called a "composite pattern". A cross-sectional view of the composite pattern is illustrated in FIG. 9B. A result of detecting the second pattern images including the composite patterns is shown in FIG. 11. An analog signal value corresponding to diffused reflected light from the composite pattern is a value corresponding to diffused reflected light from a region of the composite pattern formed with the use of the magenta toner. The interval between the patterns of the black toner is determined in advance, and hence the CPU 109 can determine a color misregistration amount of the color patterns of black based on a relative position between the region of the composite pattern formed with the use of the magenta toner and the reference color patterns using a yellow toner.

The CPU 109 is configured to convert the analog signal (FIG. 11) into a binary signal indicating the first level or the second level based on a second threshold value. The converted signal corresponds to a result of comparison between the analog signal value (FIG. 11) and the second threshold value. At this time, the CPU 109 determines the second threshold value based on an analog signal value obtained when the diffused reflected light from the front surface of the intermediate transfer belt 5 of the light emitted from the second LED 702 is received by the first PD 711. Then, the CPU 109 detects a color misregistration amount of the color pattern of the second pattern images based on the binary signal described above. The color misregistration correction using a composite pattern is a known technology, and a detailed description thereof is omitted here.

In the image forming apparatus 100 according to at least one embodiment, the color misregistration amount of the image is detected with the use of the above-mentioned pattern images (first pattern images and second pattern images). The CPU 109 detects positions of the color patterns of respective colors to calculate relative positions of the pattern images of other colors with respect to the pattern images of the reference color (yellow). The CPU 109 determines the color misregistration amounts of respective colors based on differences between the calculated relative positions and a target relative position. The CPU 109 controls timings of writing by the exposure devices 15*a* to 15*d* based on the determined color misregistration amounts to perform the color misregistration correction. Moreover, the CPU 109 may correct image data based on the detected color misregistration so that the color misregistration amounts of the image to be formed by the image forming unit 10 are suppressed, for example. The reference color is not limited to yellow, and may be magenta or cyan.

As described with reference to FIG. 2, the first PD 711 is arranged so that the light receiving angle θ with respect to the normal direction of the intermediate transfer belt 5 becomes smaller. Therefore, the position of the first pattern images can be detected accurately while the effect of the oscillation of the intermediate transfer belt 5 described with reference to FIG. 3A and FIG. 3B is suppressed.

Test Image

Figure 12A:
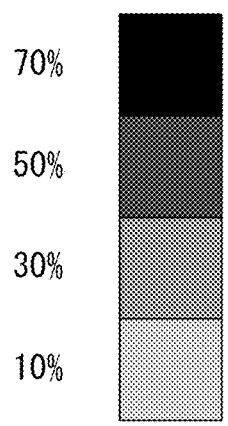
FIG. 12A and FIG. 12B are explanatory diagrams of test images for detecting an image density.
Figure 12B:
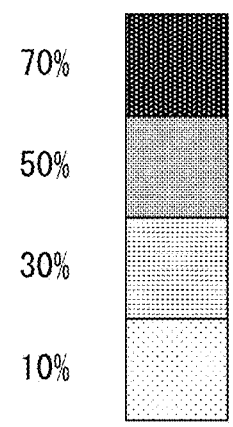

FIG. 12A and FIG. 12B are explanatory diagrams of test images for the image density detection. In FIG. 12A, an example of a first test image for the image density detection to be detected with the specularly reflected light is illustrated. In FIG. 12B, an example of a second test image for the image density detection to be detected with diffused reflected light is illustrated.

The first test image is used when the specularly reflected light of the light emitted from the first LED 701 is received by the first PD 711. The first test image is used in detecting an image density of black, in particular. The black toner absorbs light, and hence an amount of diffused reflected light from a test image of black is extremely small. Therefore, when a density of an image formed by the black toner is to be detected, the CPU 109 detects specularly reflected light from the test image of black. The first test image is formed of a gradation pattern of four image densities: 70%, 50%, 30%, and 10%. The image forming unit 10 forms the first test image based on an image signal value of the test image data. The image signal value of the test image data is determined in advance.

The first test image formed on the intermediate transfer belt 5 is read by the optical sensor 7. The analog signal output from the first PD 711 is converted to the digital signal by the A/D converter 110. The CPU 109 controls the image forming condition for the image density based on a difference between the digital signal value and a target value. For example, the CPU 109 controls an intensity of laser light emitted from the exposure device 15*d* by the image forming controller 101 to adjust the image density of black.

Figure 13:
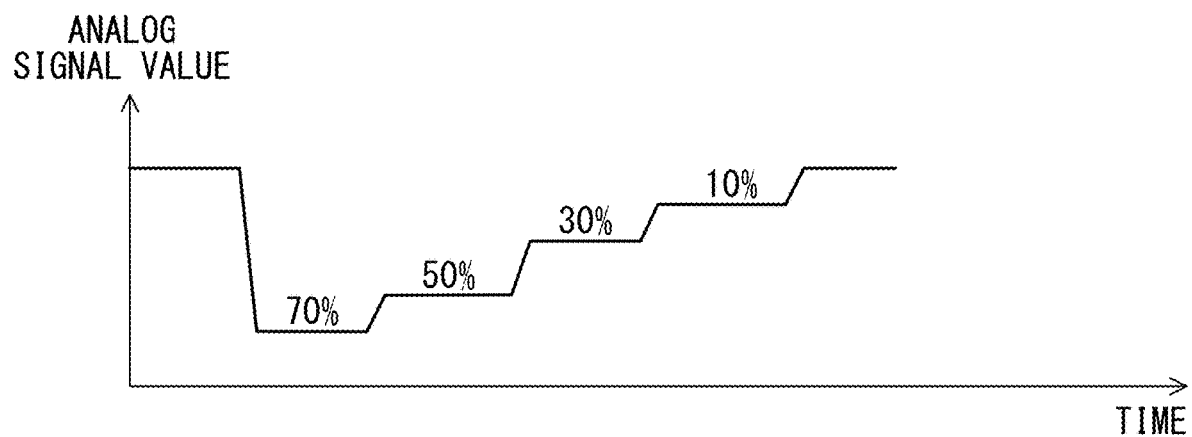
FIG. 13 is a graph for showing an example of an analog signal corresponding to a result of detecting a first test image for detecting the image density.

FIG. 13 is a graph for showing an example of an analog signal obtained when reflected light from the first test image is detected by the first LED 701 and the first PD 711. The image of the density of 70%, which is the highest density of the first test image, is reduced in the amount of specularly reflected light because a toner adhesion amount is large in addition to the fact that the light is absorbed by the black toner. Therefore, the analog signal value output by the optical sensor 7 (first PD 711) is reduced. The image of the density of 10%, which is the lowest density of the first test image, is reduced in the amount of light absorbed by the black toner as compared to the case of the density of 70%, and the toner adhesion amount is reduced, with the result that the amount of the specularly reflected light is increased. Therefore, the analog signal value output by the optical sensor 7 (first PD 711) is increased.

The second test image is used when diffused reflected light of light emitted from the second LED 702 is received by the second PD 712. The second test image is used in detecting image densities of chromatic colors, such as yellow, magenta, and cyan, in particular. Image densities for yellow, magenta, and cyan are detected with the use of diffused reflected light. The second test image is formed of a gradation pattern of four densities: 70%, 50%, 30%, and 10%. In FIG. 12B, a test image of yellow is illustrated. The second test images of the colors: yellow, magenta, and cyan are formed on the intermediate transfer belt 5.

The second test image formed on the intermediate transfer belt 5 is read by the optical sensor 7. The analog signal output from the second PD 712 is converted to the digital signal by the A/D converter 110. The CPU 109 controls the image forming condition for the image density based on a difference between the digital signal value and a target value. In this manner, the CPU 109 adjusts the image densities of yellow, magenta, and cyan.

Figure 14:
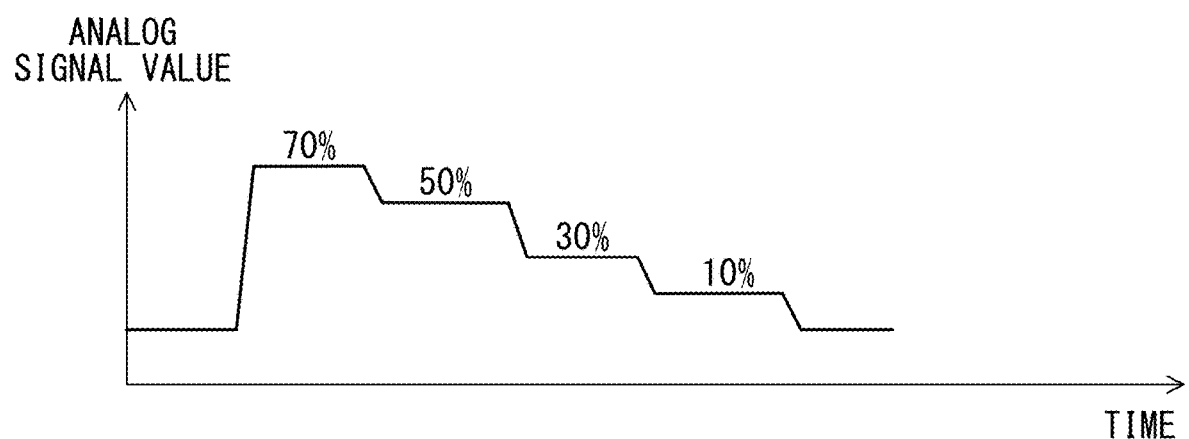
FIG. 14 is a graph for showing an example of an analog signal corresponding to a result of detecting a second test image for detecting the image density.

FIG. 14 is a graph for showing an example of an analog signal obtained when reflected light from the second test image is detected by the second LED 702 and the second PD 712. An analog signal of the second test image for yellow is illustrated here. The image of the density of 70%, which is the highest density of the second test image, is increased in the amount of diffused reflected light because a toner adhesion amount is large in addition to the fact that the light is reflected by the yellow toner. Therefore, the analog signal value output by the optical sensor 7 (second PD 712) is increased. The image of the density of 10%, which is the lowest density of the second test image, is reduced in the amount of light reflected by the yellow toner as compared to the case of the density of 70%, and the amount of the diffused reflected light is reduced. Therefore, the analog signal value output by the optical sensor 7 (second PD 712) is reduced. Analog signals obtained with the second test images of magenta and cyan exhibit similar tendencies.

Color Misregistration Correction

Figure 15:
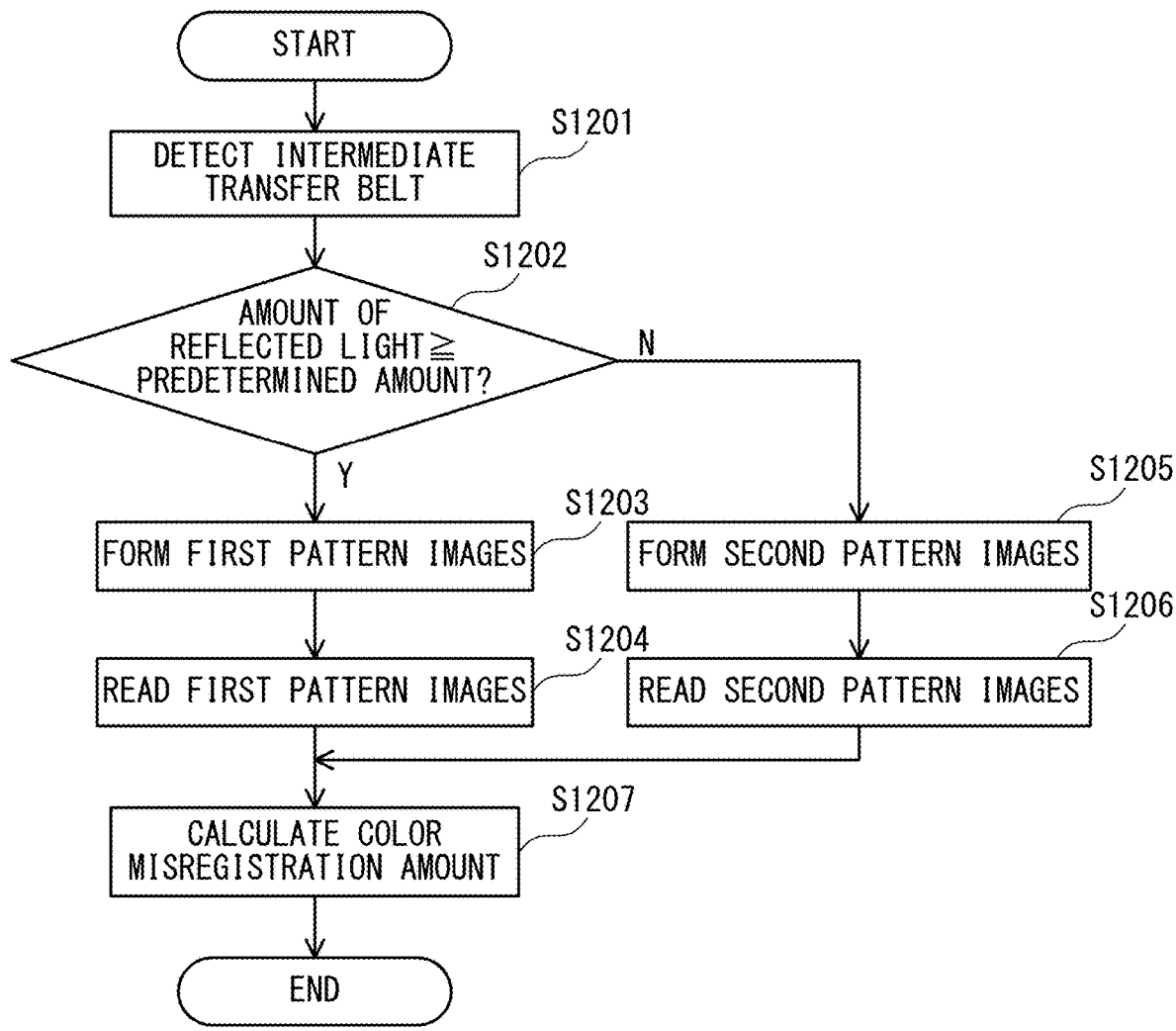
FIG. 15 is a flow chart for illustrating color misregistration detection processing.

FIG. 15 is a flow chart for illustrating processing of detecting the color misregistration amounts in at least one embodiment.

The CPU 109 first detects the amount of light reflected on the front surface of the intermediate transfer belt 5 by the optical sensor 7 (Step S1201). The CPU 109 causes the first LED 701 to emit light. An image is not formed on the intermediate transfer belt 5 at this time, and hence the light from the first LED 701 irradiates the front surface of the intermediate transfer belt 5. The first PD 711 receives the specularly reflected light from the front surface of the intermediate transfer belt 5 to output an analog signal corresponding to the amount of specularly reflected light. The CPU 109 acquires the analog signal from the first PD 711 to detect the amount of light reflected by the front surface of the intermediate transfer belt 5.

The CPU 109 determines whether the acquired amount of light reflected by the front surface of the intermediate transfer belt 5 is the predetermined amount or more (Step S1202). Through this processing, the CPU 109 determines whether the gloss of the front surface of the intermediate transfer belt 5 is high.

When the amount of light reflected by the front surface of the intermediate transfer belt 5 is the predetermined amount or more (Step S1202: Y), the CPU 109 determines that the gloss of the front surface of the intermediate transfer belt 5 is not reduced. In this case, the CPU 109 detects the color misregistration amount with the use of the first pattern images. In other words, the CPU 109 transfers pattern image data P1 to the image forming controller 101, and controls the image forming controller 101 to form the first pattern images on the intermediate transfer belt 5 (Step S1203). The CPU 109 causes the first LED 701 to emit light, and reads the first pattern images formed on the intermediate transfer belt 5 by the first PD 711 (Step S1204). In Step S1204, the CPU 109 acquires the analog signal output from the first PD 711. The CPU 109 calculates the color misregistration amount from the result of detecting the first pattern images of respective colors of yellow, magenta, cyan, and black (Step S1207).

When the amount of light reflected by the front surface of the intermediate transfer belt 5 is less than the predetermined amount (Step S1202: N), the CPU 109 determines that the gloss of the front surface of the intermediate transfer belt 5 is reduced. In this case, the CPU 109 detects the color misregistration amount with the use of the second pattern images. In other words, the CPU 109 transfers pattern image data P2 to the image forming controller 101, and controls the image forming controller 101 to form the second pattern images on the intermediate transfer belt 5 (Step S1205). The CPU 109 causes the second LED 702 to emit light, and reads the second pattern images formed on the intermediate transfer belt 5 by the first PD 711 (Step S1206). In Step S1206, the CPU 109 acquires the analog signal output from the first PD 711. Then, the CPU 109 causes the processing to proceed to Step S1207. The CPU 109 calculates the color misregistration amount based on the result of detecting the second pattern images of respective colors of yellow, magenta, cyan, and black (Step S1207). After the processing of Step S1207 is complete, the CPU 109 ends the processing of detecting the color misregistration amount.

The CPU 109 stores the calculated color misregistration amount in the memory (not shown). When the image forming apparatus 100 is to form an image on the sheet, the CPU 109 reads the color misregistration amount from the memory, and corrects image forming positions of the images to be formed based on the image data in accordance with the color misregistration amount.

As described above, the CPU 109 uses the pattern images (first pattern images and second pattern images) for the color misregistration detection corresponding to the result of detecting the gloss of the intermediate transfer belt 5 to acquire the color misregistration amount with an optimal combination of a light emitter and a light receiver. Therefore, the CPU 109 can detect an accurate color misregistration amount to perform accurate color misregistration correction.

Image Density Correction

Figure 16:
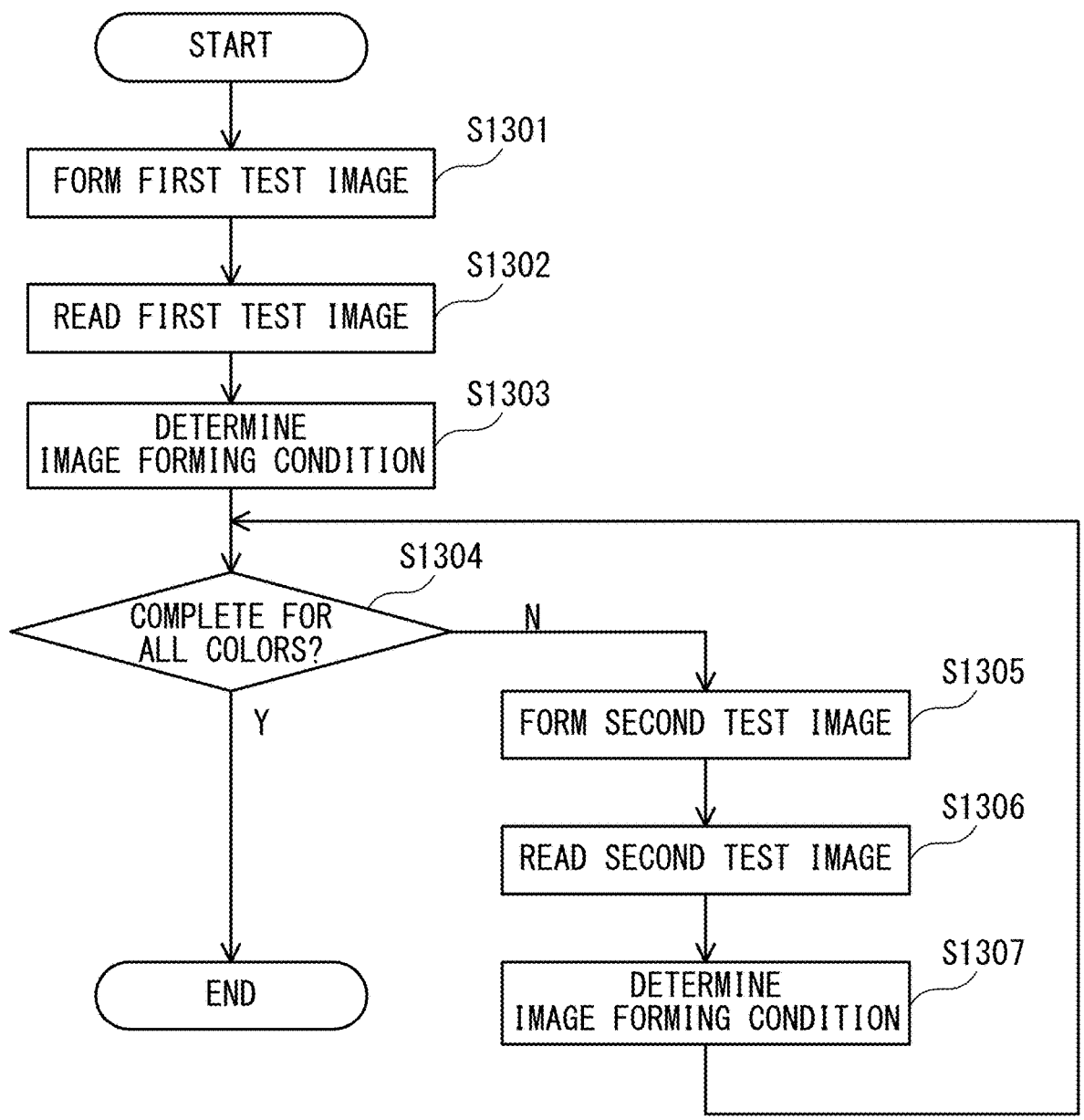
FIG. 16 is a flow chart for illustrating image density detection processing.

FIG. 16 is a flow chart for illustrating image density detection processing in at least one embodiment. In at least one embodiment, a description is given of a case in which the image density detection for the chromatic colors is performed after the image density detection for black, but the order may be reversed.

The CPU 109 transfers test image data TK to the image forming controller 101, and controls the image forming controller 101 to form the test image of black (first test image) on the intermediate transfer belt 5 (Step S1301). The CPU 109 causes the first LED 701 to emit light, and acquires the analog signal from the first PD 711, which has received the specularly reflected light, to read the test image of black (Step S1302). The CPU 109 converts a level of the analog signal corresponding to the read test image of black into a digital signal value by the A/D converter 110. The CPU 109 determines the image forming condition for the image density based on the digital signal value (Step S1303). In Step S1303, the CPU 109 determines, as the image forming condition regarding the image density for black, a correction amount of an intensity of laser light of the exposure device 15d, and stores the correction amount in the memory (not shown). When the black image is to be formed, the CPU 109 reads the correction amount from the memory, and controls the density of the black image to be formed by the image forming unit 10 in accordance with the correction amount.

After calculating the correction amount of the image density for black, the CPU 109 determines whether the image density detection processing has been performed for all colors of yellow, magenta, and cyan (Step S1304).

When the image density detection has not been performed for all colors (Step S1304: N), the CPU 109 first performs the image density detection for yellow. In other words, the CPU 109 transfers test image data TY to the image forming controller 101, and controls the image forming controller 101 to form the test image of yellow (second test image) on the intermediate transfer belt 5 (Step S1305). The CPU 109 causes the second LED 702 to emit light, and acquires the analog signal from the second PD 712, which has received the diffused reflected light, to read the test image of yellow (Step S1306). The CPU 109 converts a level of the analog signal corresponding to the read test image of yellow into a digital signal value by the A/D converter 110. The CPU 109 determines the image forming condition for the image density based on the digital signal value (Step S1307). In Step S1307, the CPU 109 determines, as the image forming condition regarding the image density for yellow, a correction amount of an intensity of laser light of the exposure device 15a, and stores the correction amount in the memory (not shown). When the yellow image is to be formed, the CPU 109 reads the correction amount from the memory, and controls the density of the yellow image to be formed by the image forming unit 10 in accordance with the correction amount.

The CPU 109 repeatedly performs the processing of Step S1305 to Step S1307 until the image density detection processing is ended for all colors. When the image density detection processing has been performed for all colors of yellow, magenta, and cyan (Step S1304: Y), the CPU 109 ends the image density detection processing.

As described above, the CPU 109 uses the test image (first test image, second test image) for the image density detection corresponding to the color to be detected to acquire the image density with an optimal combination of a light emitter and a light receiver. Therefore, the CPU 109 can detect a correction amount of an accurate image density to perform accurate image density correction.

As described above, the image forming apparatus 100 according to at least one embodiment includes the optical sensor 7 having elements bonded on the same substrate 201 by die bonding and wire bonding. Therefore, the size and the cost of the optical sensor 7 itself can be reduced. The image forming apparatus 100 uses the optical sensor 7 in both of a specularly reflected light method and a diffused reflected light method. Moreover, the image forming apparatus 100 separately prepares the detection image for use in the specularly reflected light method and the detection image for use in the diffused reflected light method.

In the processing of detecting the color misregistration amount, the image forming apparatus 100 can achieve the detection of the pattern images suitable for the state of the intermediate transfer belt 5 by combining the first LED 701, the second LED 702, and the first PD 711 in an optimal manner. The first PD 711 configured to receive the specularly reflected light for detecting the color misregistration amount is arranged so that the light receiving angle θ becomes as small as possible with respect to the normal direction of the intermediate transfer belt 5. As a result, the color misregistration amount can be detected with high accuracy even for the variation in detection position due to the oscillation of the intermediate transfer belt 5. Moreover, in the image density detection processing, the image forming apparatus 100 can achieve the detection of the test image suitable for the color of the test image by combining the first LED 701, the second LED 702, the first PD 711, and the second PD 712 in an optimal manner. The second PD 712 configured to receive diffused reflected light by the second LED 702 for the image density detection is arranged so as to form an angle that is as far as possible with respect to the specularly reflected light by the second LED 702. As a result, the image density can be detected with high accuracy even for a test image having a low density.

In order to maximize the detection ability of the optical sensor 7, it is required to compensate for the positional relationship among the elements with high accuracy. In the optical sensor 7, the first LED 701, the second LED 702, the first PD 711, and the second PD 712 are bonded to the substrate 201 by die bonding and wire bonding, and hence the first LED 701 and the first PD 711 used in the specularly reflected light method are positioned accurately. Meanwhile, positioning among other elements can be performed with a margin. Therefore, an assembly operation of the optical sensor 7 becomes easier than in the related art.

In the processing of detecting the color misregistration amount, the first LED 701 or the second LED 702 and the first PD 711 are combined. In other words, in the processing of detecting the color misregistration amount, the same element (first PD 711) is used on the light receiving side. The position of the light receiving element (first PD 711) is fixed, and hence detection accuracy of the color misregistration amount is increased as compared to the case in which the first pattern images and the second pattern images are detected by different light receiving elements. In the image density detection processing, the first LED 701 and the first PD 711, or the second LED 702 and the second PD 712 are combined.

Another Configuration Example of Optical Sensor

Figure 17:
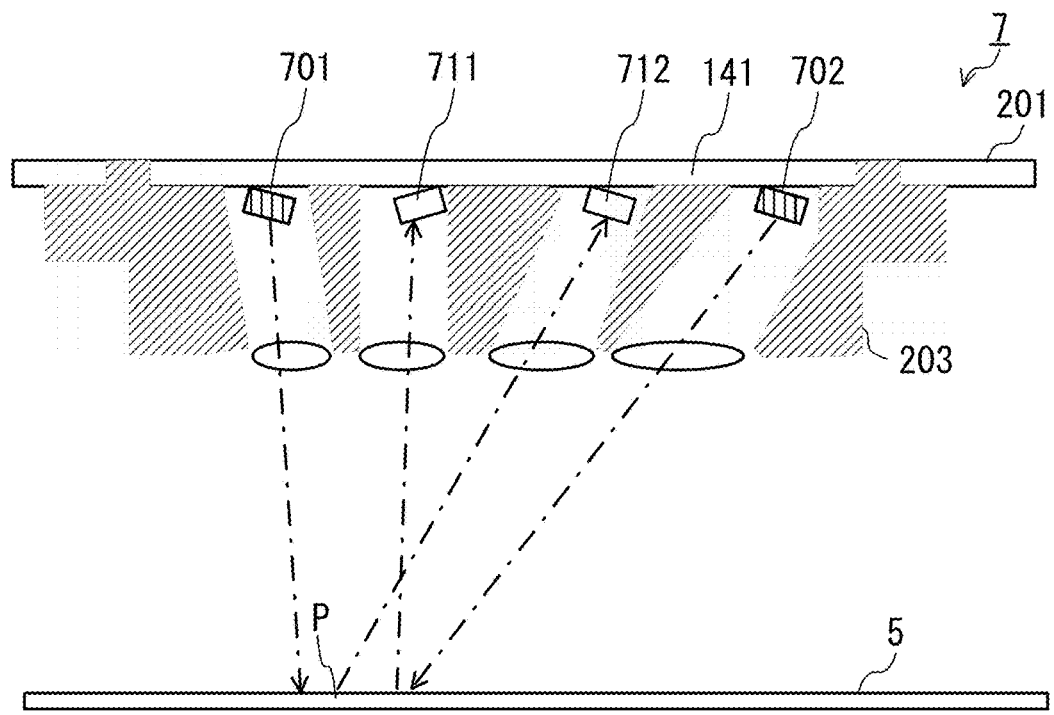
FIG. 17 is a schematic view of a main part of the optical sensor.

In the optical sensor 7 described with reference to FIG. 2, the first LED 701, the second LED 702, the first PD 711, and the second PD 712 are individual parts. In this case, there is a fear that mounting accuracy of each part may be reduced. FIG. 17 is an explanatory diagram of the optical sensor 7 in the case where the mounting accuracy of each part is reduced. When the mounting accuracy of each part is reduced, the optical sensor 7 cannot detect the detection image with the optical-axis center point P being the detection position. Therefore, it is preferred to increase the mounting accuracy of the first LED 701, the second LED 702, the first PD 711, and the second PD 712.

Figure 18:
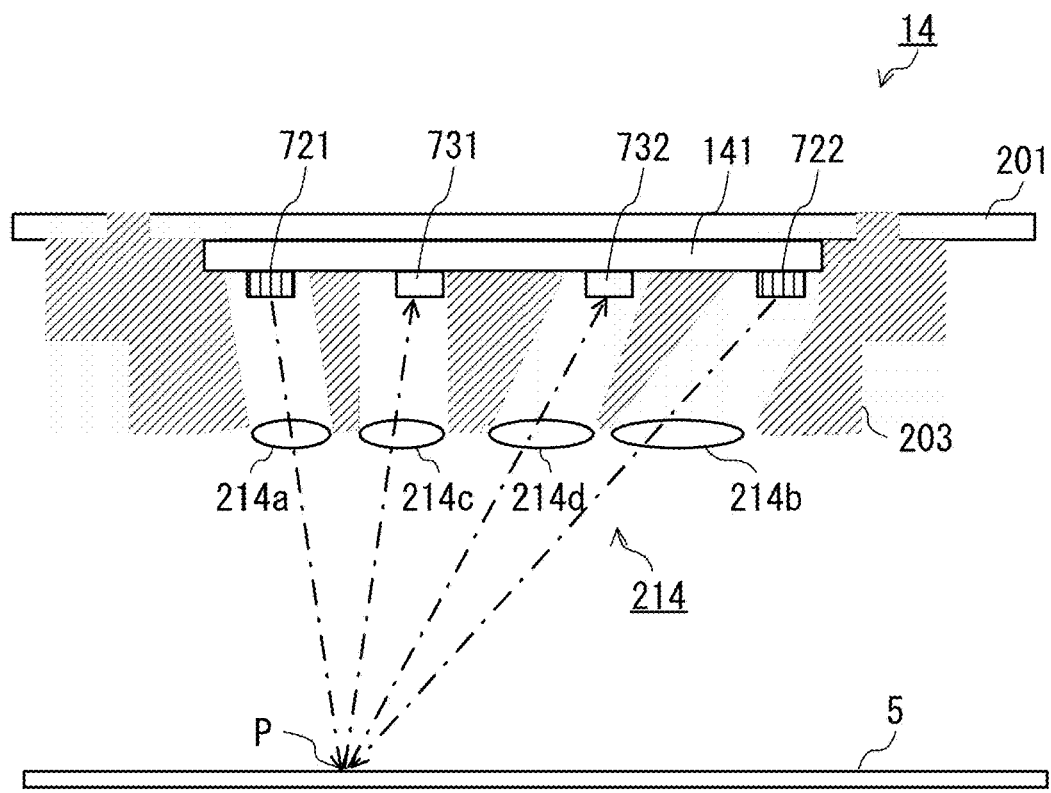
FIG. 18 is a schematic view of a main part of an optical sensor including a semiconductor substrate having formed thereon light emitting elements and light receiving elements.

FIG. 18 is a schematic view of a main part of an optical sensor 14. The optical sensor 14 includes a first LED 721 and a second LED 722 as the light emitting elements, and a first PD 731 and a second PD 732 as the light receiving elements. The first LED 721, the second LED 722, the first PD 731, and the second PD 732 are formed as semiconductor elements on the same semiconductor substrate 141. In the semiconductor substrate 141, the surface on which the first LED 721, the second LED 722, the first PD 731, and the second PD 732 are formed is referred to as a "processing surface". The optical axis of the irradiation light from the first LED 721 and the second LED 722 is orthogonal to the processing surface of the semiconductor substrate 141. Further, the optical axis of reflected light received by the first PD 731 and the second PD 732 is also orthogonal to the processing surface of the semiconductor substrate 141. The semiconductor substrate 141 is fixed on the substrate 201 with the use of an adhesive, for example, an epoxy resin.

The substrate 201 is mounted to the housing 203. The housing 203 has light guide paths for guiding the irradiation light so that light emitted from the first LED 721 and the second LED 722 efficiently irradiate the intermediate transfer belt 5. The housing 203 also has light guide paths for guiding the reflected light so that the first PD 731 and the second PD 732 efficiently receive the reflected light from the intermediate transfer belt 5. On the light guide paths for guiding the irradiation light and the light guide paths for guiding the reflected light, a lens group 214 including lenses 214a to 214d is provided.

In other words, the light emitted from the first LED 721 travels in the direction of the optical axis (one-dot broken line in FIG. 18), and irradiates the intermediate transfer belt 5, through the light guide path formed in the housing 203 and the lens 214a. The specularly reflected light from the intermediate transfer belt 5 or the detection image travels in the direction of the optical axis (one-dot broken line in FIG. 18), and reaches the first PD 711.

The light emitted from the second LED 722 travels in the direction of the optical axis (one-dot broken line in FIG. 18), and irradiates the intermediate transfer belt 5, through the light guide path in the housing 203 and the lens 214b. The first PD 731 is configured to receive diffused reflected light of the light with which the second LED 722 has irradiated the intermediate transfer belt 5. The second PD 732 is configured to receive diffused reflected light of the light emitted from the second LED 722 to irradiate the intermediate transfer belt 5.

The arrangement of the first PD 731 and the second PD 732 is similar to that of the first PD 711 and the second PD 712 of FIG. 2. Therefore, the optical sensor 14 can provide effects similar to those of the optical sensor 7 illustrated in FIG. 2. In the above-mentioned optical sensor 14, the elements are formed on the semiconductor substrate 141, and hence the positional accuracy of each element can be ensured at a high level. In other words, the optical sensor 14 can easily focus the optical axis of each element on the optical-axis center point P. As a result, the detection accuracy of the detection image is increased further than that attained by the optical sensor 7 directly bonded to the substrate.

Moreover, in the optical sensor 14 in at least one embodiment, the light emitter and the light receiver are formed on the semiconductor substrate 141, and hence the distance between the elements can be reduced. As a result, the optical sensor 14 can be downsized as compared to the optical sensor including the bullet elements (FIG. 5). Moreover, according to the optical sensor 14, the distance between the first LED 721 and the first PD 731 can be reduced, and hence the specularly reflected light of the light emitted to the object to be measured can be detected at an acuter angle than that of the optical sensor including the bullet light emitting elements and the bullet light receiving elements. As a result, even when the distance from the optical sensor 14 to the object to be measured is varied, an irradiation area on the object to be measured is hardly varied. When the intermediate transfer belt 5 is rotating, the distance from the optical sensor 14 to the detection image tends to be varied. According to the optical sensor 14 in at least one embodiment, even when the distance from the optical sensor 14 to the detection image is varied, the irradiation area is hardly varied, and hence the specularly reflected light from the detection image can be detected with high accuracy. Further, the optical sensor 14 can reduce the distance between the first LED 721 and the first PD 731, and hence design flexibility is also increased. Therefore, according to the optical sensor 14, the first LED 721, the second LED 722, the first PD 731, and the second PD 732 can be arranged in a positional relationship that is suitable for detecting the specularly reflected light and the diffused reflected light from the object to be measured. In particular, in the optical sensor 14 in which the light emitting elements are shared or the light receiving elements are shared, the specularly reflected light and the diffused reflected light from the detection image can be detected more accurately than in the related-art optical sensor including the bullet elements.

With the optical sensor 7, 14 in at least one embodiment described above, the reflected light from the detection image can be detected with high accuracy.

The above description has been given on the configuration in which the light emitter and the light receiver of the optical sensor 7, 14 are arranged in the following order: the first LED 701, 721, the first PD 711, 731, the second PD 712, 732, and the second LED 702, 722. The arrangement of the light emitter and the light receiver is not limited thereto. It is only required of the optical sensor that the light receiver be arranged so that the angles 1 and become predetermined angles with respect to the direction of the specularly reflected light by the object to be measured of the light emitted by the light emitter. Moreover, it is only required that the light receiver be arranged so that the angles α and β become respective predetermined angles with respect to the normal of the intermediate transfer belt 5 at the irradiation position (optical-axis center point P). For example, the first LED, the first PD, the second LED, and the second PD may be arranged in the stated order. Alternatively, the first PD, the first LED, the second PD, and the second LED may be arranged in the stated order. When the first PD is arranged on the side opposite to the second LED with respect to the position at which the normal from the irradiation position and the substrate cross each other, the optical sensor 7, 14 is slightly increased in size. However, as compared to the optical sensor assembled by soldering the bullet elements on the substrate in the related art, sufficient downsizing is achieved. Moreover, at least one embodiment of the present disclosure is applicable to an optical sensor excluding the first LED and including the first PD, the second PD, and one LED. In the above-mentioned configuration, the color misregistration of the second pattern images can be detected while the densities of the test images of yellow, magenta, and cyan are detected. In order to detect the density of the test image of black, a configuration separately including a sensor may be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-152596, filed Aug. 14, 2018, which is hereby incorporated by reference herein in its entirety.

What is claimed is:

1. An image forming apparatus, which is configured to form an image on a sheet, the image forming apparatus comprising:
   a plurality of image forming units configured to form images of different colors;
   an image bearing member, on which pattern images of different colors and a test image are to be formed;
   a sensor including a substrate having formed thereon a light emitting element, a first light receiving element, and a second light receiving element; and
   a controller configured to:
      adjust color misregistration based on a result of receiving diffused reflected light from the pattern images by the first light receiving element; and
      adjust a density of an image to be formed by the image forming apparatus based on a result of receiving diffused reflected light from the test image by the second light receiving element,
   wherein a first angle is smaller than a second angle, the first angle being formed between a normal of the image bearing member and a first virtual line, the normal passing through a point on the image bearing member at which an optical axis of light from the light emitting element intersects, the first virtual line connecting the point and the first light receiving element, and the second angle being formed between the normal and a second virtual line connecting the point and the second light receiving element,
      wherein the first angle is smaller than an angle formed between the normal and the optical axis,
      wherein the second angle is smaller than the angle formed between the normal and the optical axis, and
      wherein the second light receiving element on the substrate is provided between the light emitting element on the substrate and the first light receiving element on the substrate.

2. The image forming apparatus according to claim 1, wherein
   the test image is formed by an image forming unit for a chromatic color of the plurality of image forming units, and
   the controller is configured to adjust an image density of the image forming unit for the chromatic color.

3. The image forming apparatus according to claim 1, wherein the sensor further includes another light emitting element, the other light emitting element being formed on the substrate.

4. The image forming apparatus according to claim 3, wherein the controller is configured to adjust a density of an image to be formed by the image forming apparatus based on a result of receiving specularly reflected light from another test image by the first light receiving element.

5. The image forming apparatus according to claim 3, wherein an angle of incidence of the other light emitting element is smaller than that of the light emitting element.

6. The image forming apparatus according to claim 1, wherein
the sensor further includes another light emitting element, which is formed on the substrate, and
the first light receiving element and the second light receiving element are formed between the light emitting element and the other light emitting element.

7. The image forming apparatus according to claim 1, wherein the first light receiving element is formed on the light emitting element side of a position at which the normal and the substrate cross each other.

8. The image forming apparatus according to claim 1, wherein
the substrate comprises a semiconductor substrate, and
the light emitting element, the first light receiving element, and the second light receiving element comprise semiconductor elements formed on the semiconductor substrate.

9. The image forming apparatus according to claim 1, wherein the controller is configured to control an image forming condition to adjust a density of an image to be formed, based on a result of receiving the diffused reflected light from the test image by the second light receiving element.

10. The image forming apparatus according to claim 9, wherein
the plurality of image forming units each include a photosensitive member, a light source configured to expose the photosensitive member to light to form an electrostatic latent image, and a developing roller configured to develop the electrostatic latent image formed on the photosensitive member, and
the image forming condition includes a light intensity of the light source.

11. The image forming apparatus according to claim 1, wherein the sensor further comprises a lens including a first lens section and a second lens section,
wherein the first light receiving element receives reflected light from the pattern images through the first lens section, and
wherein the second light receiving element receives reflected light from the test image through the second lens section.

12. The image forming apparatus according to claim 1, wherein the first angle is equal to or less than 7 degrees.

* * * * *